United States Patent
Kobayashi et al.

(10) Patent No.: US 9,377,769 B2
(45) Date of Patent: Jun. 28, 2016

(54) CONTROL APPARATUS FOR UPDATING A USER PROGRAM WHILE PROCESSING IS BEING PERFORMED AND RECORDING MEDIUM

(75) Inventors: Akiro Kobayashi, Kusatsu (JP); Yoshihisa Kato, Ritto (JP); Koji Yaoita, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 451 days.

(21) Appl. No.: 13/399,295

(22) Filed: Feb. 17, 2012

(65) Prior Publication Data

US 2012/0240132 A1 Sep. 20, 2012

Related U.S. Application Data

(63) Continuation of application No. PCT/JP2011/071860, filed on Sep. 26, 2011.

(30) Foreign Application Priority Data

Mar. 15, 2011 (JP) ................................ 2011-056869

(51) Int. Cl.
*G06F 9/46* (2006.01)
*G05B 19/05* (2006.01)
*G06F 9/48* (2006.01)

(52) U.S. Cl.
CPC ............ *G05B 19/056* (2013.01); *G06F 9/4887* (2013.01); *G05B 2219/13004* (2013.01); *G05B 2219/13153* (2013.01)

(58) Field of Classification Search
None
See application file for complete search history.

(56) References Cited

U.S. PATENT DOCUMENTS 5,371,887 A * 12/1994 Yoshida ............... G06F 9/3851
711/202
2004/0230322 A1 11/2004 Oka et al.

FOREIGN PATENT DOCUMENTS

| EP | 0757305 | 2/1997 | |
| EP | 0757305 A1 * | 2/1997 | ............ G05B 19/05 |
| EP | 1998240 | 12/2008 | |

(Continued)

OTHER PUBLICATIONS

Anonymous, "Development of curriculum and innovative training tools for industrial automation systems for people employed in SMEs—Module 4: Application of PLC in Industrial Automation—Chapter III, PLC programming", XP055103277, URL:http://automatic-project.eu/Modules_en/Module 4, Chapter 3-ENG.pdf, Jan. 1, 2009, pp. 1-19.

(Continued)

*Primary Examiner* — Wissam Rashid
(74) *Attorney, Agent, or Firm* — Greenblum & Bernstein, P.L.C.

(57) ABSTRACT

A control apparatus capable of updating a user program while processing is being performed in a multitasking manner is provided. A processor includes a memory that stores a user program containing a program organization unit as well as a central processing unit executing a task containing the user program and also updating the program organization unit stored in the memory. The central processing unit is configured to execute a plurality of tasks concurrently and to execute each task with a period corresponding to the task. Moreover, the central processing unit is configured to update the program organization unit stored in the memory during the period of time from when a plurality of tasks to be executed have been finished until when the plurality of tasks are executed again.

6 Claims, 7 Drawing Sheets

(56) References Cited

FOREIGN PATENT DOCUMENTS

| JP | 5-216507 | 8/1993 |
|---|---|---|
| JP | 10-312275 | 11/1998 |
| JP | 2004-295872 | 10/2004 |
| JP | 2009-181443 | 8/2009 |

OTHER PUBLICATIONS

Anonymous, "Development of curriculum and innovative training tools for industrial automation systems for people employed in SMEs—Module 4: Application of PLC in Industrial Automation—Chapter II programmable Logic Controller", XP055103276, URL:http://automatic-project.eu/Modules_en/Module 4, Chapter 2-ENG.pdf, Jan. 1, 2009, pp. 1-14.

Gupta D et al., "Increasing system availability through on-line software version change", Fault-Tolerant Computng, 1993. FTCS-23. Digest of Papers., The Twenty-Third International Symposium on Toulouse, France Jun. 22-24, 1993, Los Alamitos, CA, USA, IEEE Comput. SOC, XP032159640, Jun. 22, 1993, pp. 30-35.

Anonymous, "Development of curriculum and innovative training tools for industrial automation systems for people employed in SMEs—Module 4: Application of PLC in Industrial Automation—Chapter XII, PLC selection, safety and commissioning", XP055103279, URL:http://automatic-project.eu/Modules_en/Module 4, Chapter 12-ENG.pdf, Jan. 1, 2009, pp. 1-8.

Anonymous, ""Development of curricula and innovative training tools for industrial automation systems for people employed in SMEs"—AutoMatic", XP055103280, URL:http://www.adam-europe.eu/prj/9204/project_9204_en.pdf, Jan. 1, 2011, pp. 1-15.

Search report from E.P.O., mail date is Feb. 27, 2014.

\* cited by examiner

| Name | Priority | Period | User program | Program organization unit of user program | |
|---|---|---|---|---|---|
| | | | | Program | Function/function block |
| Task D | 1 | 1ms | UPd | Pd1, Pd2 | FB4 |
| Task E | 2 | 2ms | UPe | Pe1, Pe2 | FB4 |

CONTROL APPARATUS FOR UPDATING A USER PROGRAM WHILE PROCESSING IS BEING PERFORMED AND RECORDING MEDIUM

CROSS-REFERENCE TO RELATED APPLICATIONS

This is a continuation application of PCT/JP2011/071860 filed Sep. 26, 2011, designating the United States of America, the disclosure of which, including the specification, drawings, and claims, is incorporated by reference in its entirety. The disclosure of Japanese Patent Application No. 2011-056869 filed Mar. 15, 2011, including the specification, drawings, and claims is expressly incorporated herein by reference in its entirety.

FIELD OF DISCLOSURE

The present disclosure relates to a control apparatus for controlling a controlled device, a system program that can be executed on the control apparatus, and a recording medium in which the system program is recorded.

BACKGROUND INFORMATION

Conventionally, PLCs (programmable logic controllers) for controlling industrial machines and the like installed on production lines in factories have been known.

A PLC includes a CPU unit for controlling the PLC, an input unit to which a signal from a sensor is input, and an output unit outputting a control signal to an industrial machine or the like. The CPU unit has a memory storing a user program. This user program is configured to be editable by a tool apparatus connected to the CPU unit.

In the PLC, a process of capturing a signal input to the input unit into the memory of the CPU unit, a process of executing the user program, a process of writing the result of execution of the user program (calculation result) to the memory and sending the calculation result to the output unit, and peripheral processes such as exchanging data with the tool apparatus are performed repeatedly. The PLC thus controls the industrial machine or the like based on an input from the sensor.

Moreover, conventionally, PACs (programmable automation controllers) having the advanced software functionality of personal computers and the reliability of PLCs also have been known (see Patent Document 1 (JP 2009-181443A), for example).

A PAC disclosed in Patent Document 1 (JP 2009-181443A) is configured to execute a plurality of tasks concurrently by time sharing and to execute each task with a period corresponding to that task. That is to say, in this PAC, processing is performed in a multitasking manner. It should be noted that each task contains execution of a user program corresponding to that task.

Patent Documents
Patent Document 1: JP 2009-181443A

Problem to be Solved by the Disclosure

However, the conventional PAC disclosed in Patent Document 1 (JP 2009-181443A) has a problem in that it is difficult to update the user program with the tool apparatus while processing is being performed in a multitasking manner. Specifically, there is a problem in that in the case where a program organization unit (POU) constituting a user program is used in a plurality of tasks and this program organization unit is the target of editing, there may be a possibility that the consistency among the calculation results of the tasks can no longer be maintained. The reason for this is that because the tasks have different periods, the timing at which a change to that program organization unit is reflected varies. In other words, in the case where a change is made to a program organization unit used in a plurality of tasks, a situation may arise in which while the change is reflected in a task having a short period, the program organization unit before changing is retained and the change is not reflected in a task having a long period.

The present disclosure has been made to solve the above-described problems, and it is an object of the present disclosure to provide a control apparatus capable of updating a user program while processing is being performed in a multitasking manner, a system program that can be executed on the control apparatus, and a recording medium in which the system program is recorded.

SUMMARY OF THE DISCLOSURE

According to an aspect of the present disclosure, a control apparatus is provided that for controls a controlled device. The apparatus includes a first storage portion (a first storage) that stores a user program containing a program organization unit, a task execution portion (a task executor) executing a task containing the user program, and an updating portion (an updater) updating the program organization unit stored in the first storage portion. The task execution portion executes a plurality of tasks concurrently and executes each task with a period corresponding to the task. The updating portion updates the program organization unit stored in the first storage portion during the period of time from when the task execution portion has finished execution of a plurality of tasks until when the task execution portion executes the plurality of tasks again. It should be noted that "executing a plurality of tasks concurrently" includes a situation where the plurality of tasks are executed concurrently at the same time and a situation where the plurality of tasks are executed concurrently by time sharing.

With such a configuration, the program organization unit is updated during the period of time from when a plurality of tasks to be executed have been finished until when the plurality of tasks are executed again, and therefore, even in the case where the tasks have different periods, a change to the program organization unit can be simultaneously reflected in the tasks. Thus, in the case where a change is made to a program organization unit used in a plurality of tasks, a situation in which while the change is reflected in a task having a short period, the program organization unit before changing is retained and the change is not reflected in a task having a long period does not arise. Therefore, the consistency among the calculation results of the tasks can be maintained, and accordingly, the user program can be updated while processing is being performed in a multitasking manner.

In the above-described control apparatus, the updating portion may be configured to update the program organization unit stored in the first storage portion during the period of time from when all tasks to be executed by the task execution portion have been finished until when the task execution portion executes all of the tasks again.

With such a configuration, a change to the program organization unit can be simultaneously reflected in the tasks in an easy manner.

In the above-described control apparatus, the control apparatus may include an accepting portion (an acceptor) accepting an update of the program organization unit by the updating portion, wherein the updating portion is configured to update the program organization unit stored in the first storage portion during the period of time from when execution of tasks to be executed by the task execution portion that contain the program organization unit for which the update was accepted by the accepting portion has been finished until when the tasks containing the program organization unit for which the update was accepted by the accepting portion are executed again.

With such a configuration, in the case where a task that does not contain the program organization unit for which the update was accepted has a long period, it is unnecessary to wait until that task is finished, and therefore, the program organization unit can be updated quickly.

In this case, the control apparatus may include a second storage portion (a second storage) that stores information regarding a task to be executed by the task execution portion, and a determination portion (a determiner) that determines whether or not the program organization unit for which the update was accepted by the accepting portion is contained in the task to be executed by the task execution portion based on the information regarding the task stored in the second storage portion.

With such a configuration, whether or not each task contains the program organization unit for which the update was accepted can be easily determined.

In the above-described control apparatus, the task execution portion may be configured to execute a plurality of tasks concurrently at the same time.

With such a configuration, the task processing capacity can be improved.

In the above-described control apparatus, the task execution portion may be configured to execute a plurality of tasks concurrently by time sharing.

With such a configuration, task processing can be performed efficiently.

In the above-described control apparatus, the plurality of tasks may include a reference task and a task other than the reference task and the period of the task other than the reference task be set to an integral multiple of the period of the reference task.

Such a configuration allows the periods of the plurality of tasks to readily coincide.

According to another aspect of the disclosure, a system program is provided that can be executed on a control apparatus for controlling a controlled device. The program is adapted to cause the control apparatus including a first storage portion (a first storage) storing a user program containing a program organization unit to execute the procedures of concurrently executing a plurality of tasks containing the user program with periods corresponding to the individual tasks, and update the program organization unit stored in the first storage portion during the period of time from when the executed plurality of tasks have been finished until when the plurality of tasks are executed again.

With such a configuration, it is possible to cause the control apparatus to update the user program while performing processing in a multitasking manner.

According to another aspect of the disclosure, a recording medium is provided that includes a computer-readable recording medium in which the above-describe system program is recorded.

According to another aspect of the disclosure, a non-transitory computer readable medium is provided that stores a system program that can be executed on a control apparatus for controlling a device. The program allows the control apparatus concurrently execute a plurality of tasks containing a user program with periods corresponding to individual tasks, and update a program organization unit stored in a first storage portion during a period of time from when the executed plurality of tasks have been finished until when the plurality of tasks are executed again.

Effects of the Disclosure

According to the present disclosure, it is possible to provide a control apparatus capable of updating a user program while processing is being performed in a multitasking manner, a system program that can be executed on the control apparatus, and a recording medium in which the system program is recorded.

DETAILED DESCRIPTION

Hereinafter, embodiments of the present disclosure will be described with reference to the accompanying drawings.

First Embodiment

The configuration of a PAC 100 provided with a CPU unit 1 according to a first embodiment will be first described with reference to FIGS. 1 to 3.

Figure 1:
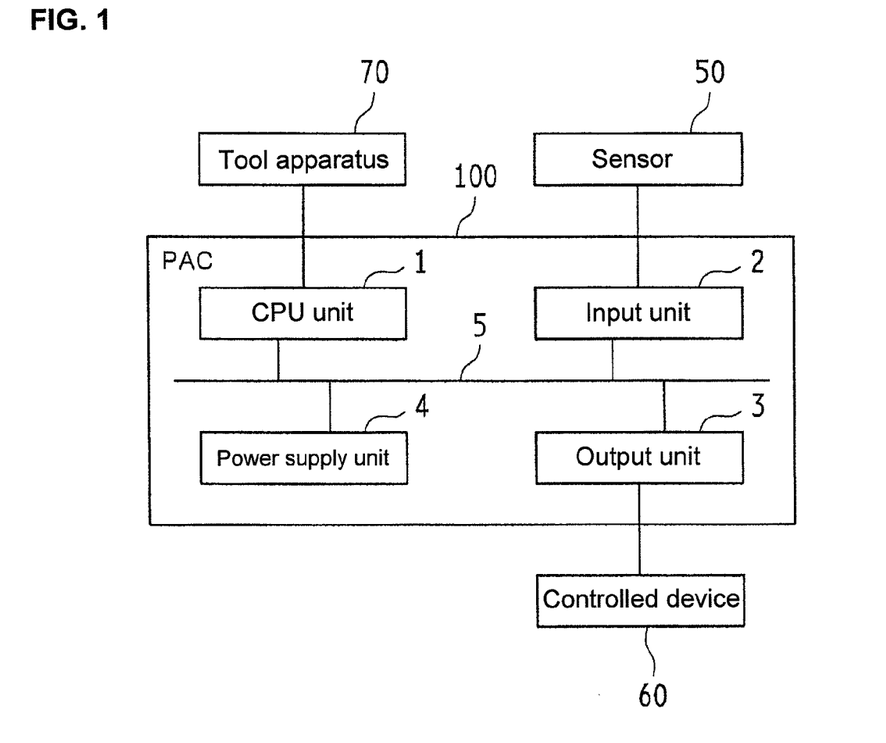
FIG. 1 is a block diagram showing the configuration of a PAC provided with a CPU unit according to a first embodiment of the present disclosure.

As shown in FIG. 1, the PAC 100 includes the CPU unit 1 for controlling the PAC 100, an input unit 2 to which a signal from a sensor 50 is input, an output unit 3 outputting a control signal to a controlled device 60 such as an industrial machine, a power supply unit 4 supplying electric power to the various units, and an internal bus 5 that connects the units to one another. It should be noted that the CPU unit 1 is an example of the "control apparatus" of the present disclosure.

The PAC 100 is configured to control the controlled device 60 based on an input from the sensor 50 by executing a task. Here, the task contains execution of a user program for controlling the controlled device 60.

A system program 121 (see FIG. 2) is installed in the CPU unit 1, and the operation of the CPU unit 1 is controlled by the system program 121 being executed. It should be noted that the system program 121 contains a program for executing a process of capturing a signal input to the input unit 2 into the CPU unit 1, a program for executing a process of sending the result of calculation by the CPU unit 1 to the output unit 3, and the like.

Figure 2:
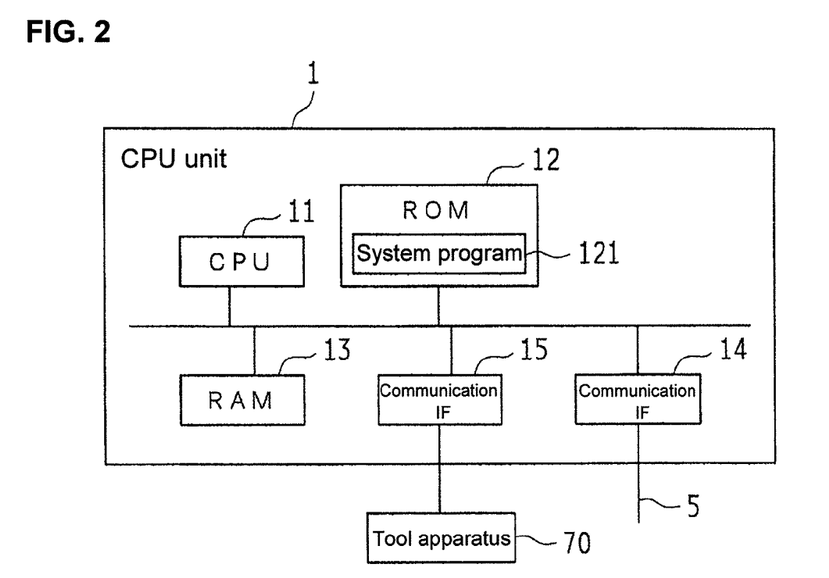
FIG. 2 is a block diagram showing the configuration of the CPU unit of the PAC shown in FIG. 1.

As shown in FIG. 2, the CPU unit 1 includes a CPU 11, a ROM 12, a RAM 13, and communication interfaces (hereinafter referred to as the "communication IFs") 14 and 15. It should be noted that the CPU 11 is an example of the "task execution portion" (executor), "updating portion" (updater), and "determination portion" (determiner) of the present disclosure. Moreover, the ROM 12 is an example of the "first storage portion" (first storage) and "second storage portion" (second storage) of the present disclosure, and the communication IF 15 is an example of the "accepting portion" (acceptor) of the present disclosure.

The CPU 11 has a function of executing the system program 121. The CPU 11 is single-core and is configured to execute a plurality of tasks concurrently by time sharing. That is to say, in the CPU 11, processing is performed in a multitasking manner.

The ROM 12 is a non-volatile memory, which may be, for example, a flash memory. The installed system program 121 is stored in the ROM 12. Moreover, information L1 (see FIG. 3) regarding tasks to be executed in the CPU unit 1 is stored in the ROM 12. The information L1 regarding the tasks contains the name of each task, the priority of each task, the execution period of each task, the configuration of a user program executed in each task, and a program organization unit (hereinafter referred to as the "POU") constituting the user program of each task. It should be noted that with regard to the tasks, a task of a smaller value of priority is executed preferentially. Moreover, in the CPU unit 1, a control cycle of a preset time interval (e.g., 1 ms) is employed as a cycle shared by the entire processing. Furthermore, the user program is written in, for example, the ladder language.

Here, a POU is the minimum unit for program management and may be a program, a function, or a function block. Functions and function blocks serving as POUs are reusable. That is to say, functions and function blocks serving as POUs can be shared by a plurality of user programs. It should be noted that a function has the functionality that, when a predetermined input value has been input, it outputs a fixed output value corresponding to the predetermined input value, and a function block has the functionality that it is capable of having an internal state and thus outputs a value that is not the same for every input value.

Figure 3:
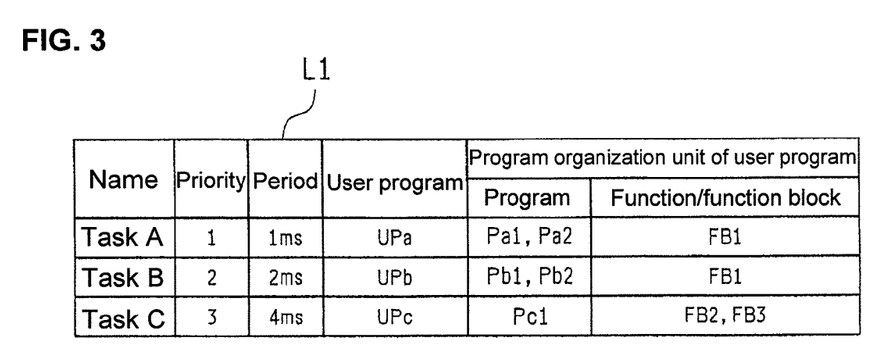
FIG. 3 is a diagram for explaining information regarding tasks to be stored in a ROM of the CPU unit shown in FIG. 2.

In the example shown in FIG. 3, a task A is executed with priority over tasks B and C and executed with a period of 1 ms. That is to say, the execution cycle of the task A is equal to a single control cycle (a time interval of 1 ms). The task A contains a user program UPa constituted by programs Pa1 and Pa2. Moreover, the task A contains a function block FB1 used in the program Pa1. It should be noted that the task A is an example of the "reference task" of the present disclosure.

Moreover, the task B is executed with priority over the task C and executed with a period of 2 ms. That is to say, the execution cycle of the task B is twice the control cycle (a time interval of 2 ms). The period of the task B is set to an integral multiple of (twice) the period of the task A. The task B contains a user program UPb constituted by programs Pb1 and Pb2. Moreover, the task B contains a function block FB1 used in the program Pb2. It should be noted that the task B is an example of the "task other than the reference task" of the present disclosure.

Furthermore, the task C is executed with lower priority than the tasks A and B and executed with a period of 4 ms. That is to say, the execution cycle of the task C is four times the control cycle (a time interval of 4 ms). The period of the task C is set to an integral multiple of (four times) the period of the task A. The task C contains a user program UPc constituted by a program Pc1. Moreover, the task C contains function blocks FB2 and FB3 used in the program Pc1. It should be noted that the task C is an example of the "task other than the reference task" of the present disclosure.

The user programs UPa to UPc are stored in the ROM 12. Thus, the programs Pa1, Pa2, Pb1, Pb2, and Pc1 serving as the POUs and the function blocks FB1 to FB3 serving as the POUs are stored in the ROM 102.

The RAM 13 is a non-volatile memory, which may be, for example, a DRAM. The RAM 13 has a function of temporarily storing the system program 121 and the like to be executed by the CPU 11. The communication IF 14 is connected to the internal bus 5 and provided in order for the CPU unit 1 to communicate with the individual units via the internal bus 5. The communication IF 15 is connected to the tool apparatus 70 and provided in order for the CPU unit 1 to communicate with the tool apparatus 70.

The tool apparatus 70 is, for example, a personal computer and has functions of creating and editing a user program to be executed in the PAC 100. The tool apparatus 70 also has a function of downloading a user program from the PAC 100 and a function of uploading a user program to the PAC 100.

The CPU unit 1 is configured to be able to update the user program while processing is being performed in a multitasking manner. That is to say, the CPU unit 1 is configured to be able to perform online editing. It should be noted that online editing refers to changing or adding a part of the user program with the tool apparatus 70 without stopping the operation (execution of the user program of a task) of the CPU unit 1.

The CPU unit 1 is configured to update the user program stored in the ROM 12 during the period of time from when a plurality of executed tasks have been finished after the user program uploaded from the tool apparatus 70 has been received by the communication IF 15 until when the plurality of tasks are executed again. Specifically, the CPU unit 1 is configured to update the user program stored in the ROM 12 when the execution cycles of the plurality of tasks that are currently being executed coincide (when the plurality of tasks are synchronized) after the user program has been received.

That is to say, the CPU unit 1 according to the first embodiment is configured so that when the execution cycles of all the tasks (tasks A, B, and C) of the executed plurality of tasks (tasks A, B, and C) coincide after a POU (function block FB1a) of the user program has been received by the communication IF 15, the POU (function block FB1) of the user program stored in the ROM 12 is changed to the received POU (function block FB1a).

Figure 4:
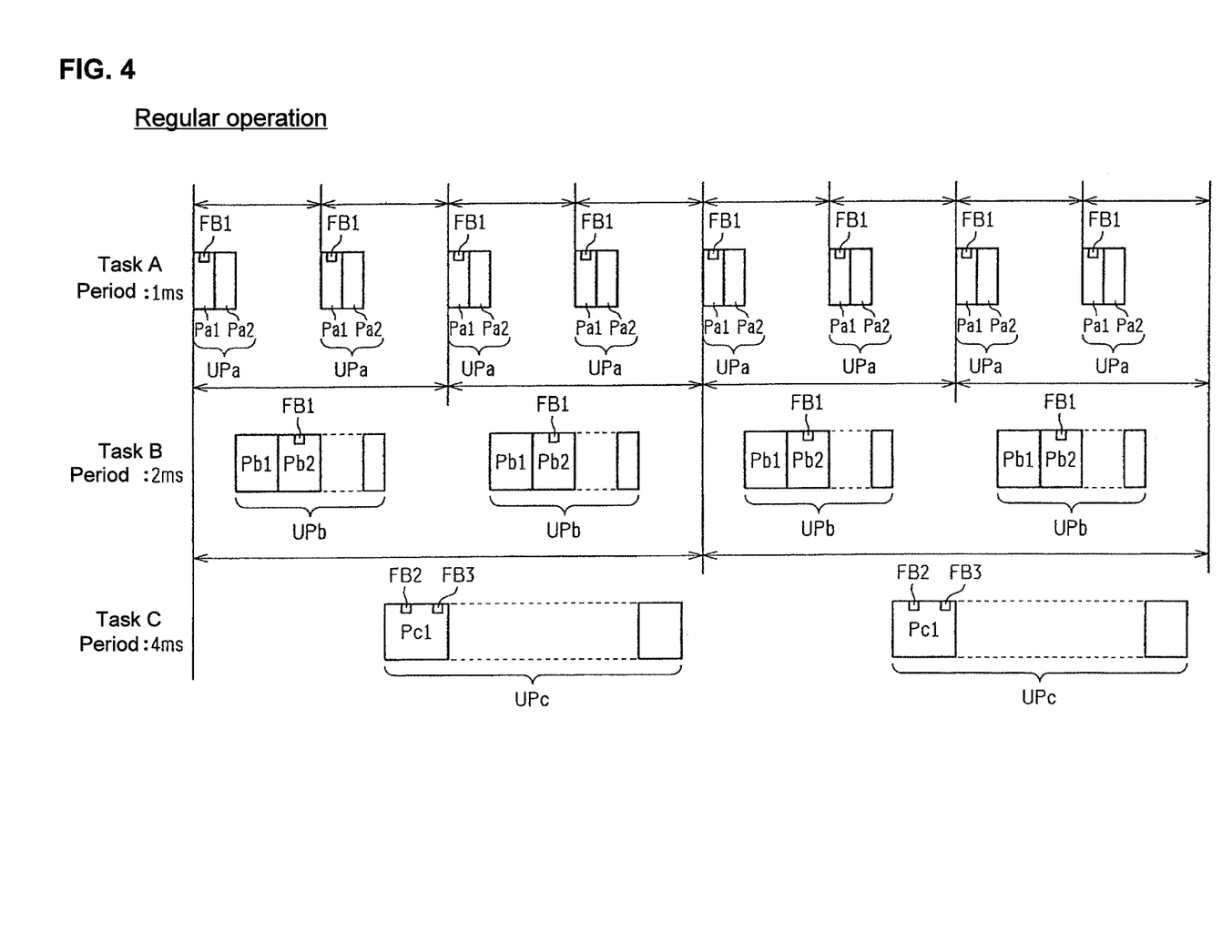
FIG. 4 is a time chart for explaining the regular operation of the CPU unit according to the first embodiment of the present disclosure.

Next, the regular operation of the CPU unit 1 according to the first embodiment will be described with reference to FIG. 4. It should be noted that the operation described below is performed by the CPU 11 of the CPU unit 1 (see FIG. 2) executing the system program 121. That is to say, the system program 121 is a system program for causing the CPU unit 1 to execute the operation described below.

In the CPU unit 1, a predetermined initialization process is executed once the power is turned on.

Then, the execution cycles of the tasks A, B, and C are started simultaneously with the control cycle. It should be noted that the task A is executed with a period of 1 ms, the task B is executed with a period of 2 ms, and the task C is executed with a period of 4 ms.

Specifically, processing of the task A of the highest priority is started first. At this time, actual processing of the tasks B and C, which are of lower priority than the task A, is not started, and these tasks are put in a standby state.

Then, the user program UPa of the task A is executed, and once the processing of the task A is finished, processing of the task B, which is of higher priority than the task C, is started. At this time, the task C remains in the standby state. Then, the user program UPb of the task B is executed.

Subsequently, when 1 ms has elapsed after the simultaneous start of the execution cycles of the tasks A, B, and C, the execution cycle of the task A has elapsed, and therefore, the user program UPb of the task B is interrupted, and execution of the task A is started. At this time, the tasks B and C are in the standby state.

Then, when the user program UPa of the task A has been executed and the processing of the task A has been finished, processing of the interrupted task B is resumed. Thus, the rest of the user program UPb of the task B is executed. Then, when the processing of the task B has been finished, processing of the task C is started, and the user program UPc of the task C is executed.

Subsequently, when 2 ms has elapsed after the simultaneous start of the execution cycles of the tasks A, B, and C, the execution cycle of the task A has elapsed, and therefore, the user program UPc of the task C is interrupted, and execution of the task A is started. At this time, the execution cycle of the task B has also elapsed, and therefore, the tasks B and C are in the standby state. That is to say, when 2 ms has elapsed after the simultaneous start of the execution cycles of the tasks A, B, and C, the execution cycles of the tasks A and B are simultaneously started again.

Then, when the user program UPa of the task A has been executed and the processing of the task A has been finished, processing of the task B is started. At this time, the task C is in the standby state. Then, the user program UPb of the task B is executed.

Subsequently, when 3 ms has elapsed after the simultaneous start of the execution cycles of the tasks A, B, and C, the execution cycle of the task A has elapsed, and therefore, the user program UPb of the task B is interrupted, and execution of the task A is started. At this time, the tasks B and C are in the standby state.

Then, when the user program UPa of the task A has been executed and the processing of the task A has been finished, processing of the interrupted task B is resumed. Thus, the rest of the user program UPb of the task B is executed. Then, when the processing of the task B has been finished, processing of the interrupted task C is resumed. Thus, the rest of the user program UPc of the task C is executed. After the processing of the task C has been finished, when 4 ms has elapsed after the simultaneous start of the execution cycles of the tasks A, B, and C, the execution cycle of the task A has elapsed, and therefore, execution of the task A is started. At this time, since the execution cycles of the tasks B and C have also elapsed, the tasks B and C are in the standby state. That is to say, when 4 ms has elapsed after the simultaneous start of the execution cycles of the tasks A, B, and C, the execution cycles of the tasks A, B, and C are simultaneously started again. The above-described operation is performed repeatedly thereafter.

Figure 5:
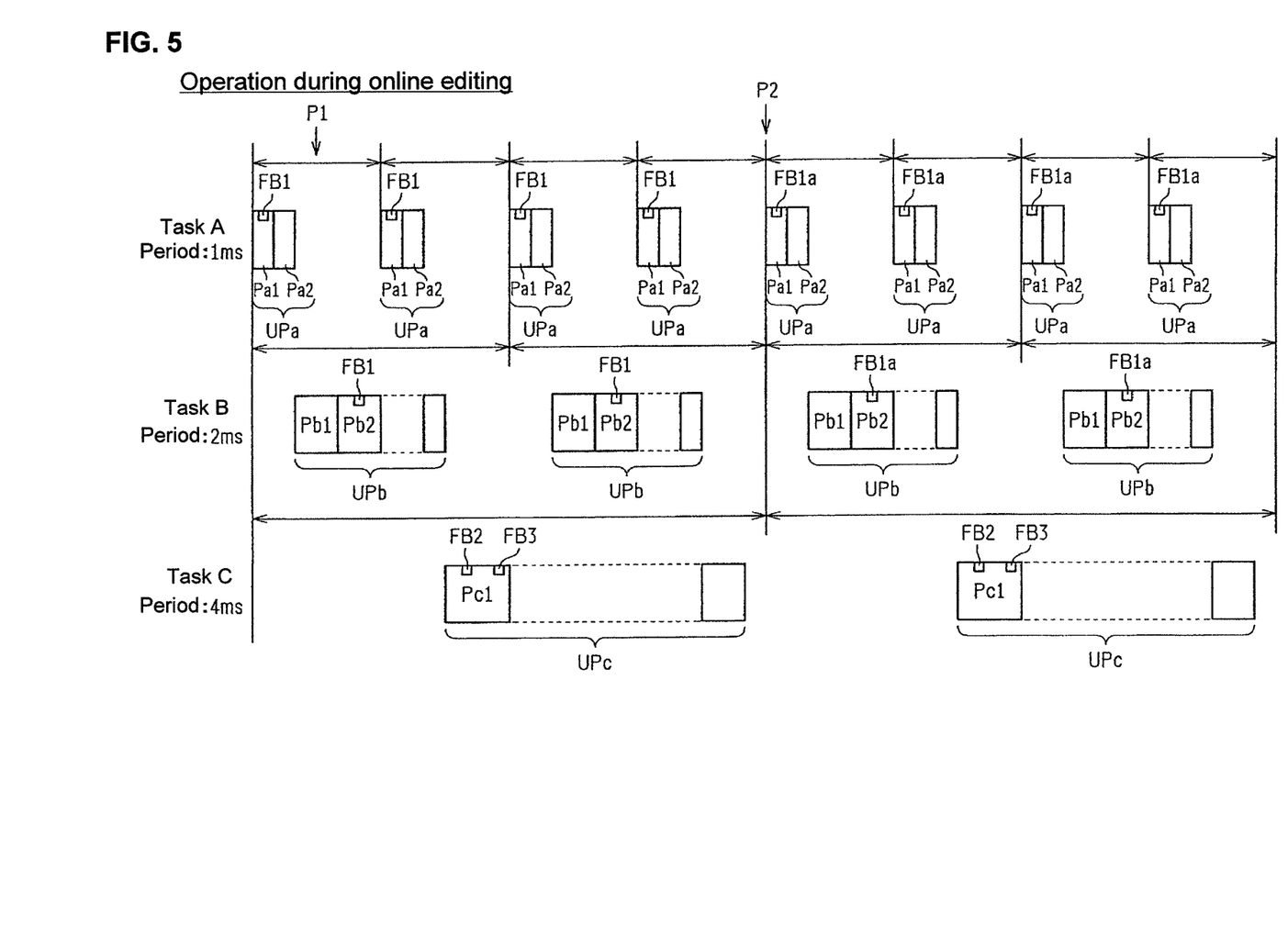
FIG. 5 is a time chart for explaining the operation of the CPU unit according to the first embodiment of the present disclosure during online editing.

Next, the operation of the CPU unit 1 according to the first embodiment during online editing will be described with reference to FIG. 5. It should be noted that online editing refers to changing or adding a part of the user program with the tool apparatus 70 (see FIG. 2) without stopping the operation (execution of the user program of a task) of the CPU unit 1 (see FIG. 2).

It should be noted that hereinbelow, the operation in the case where the user program is uploaded from the tool apparatus 70 while the above-described regular operation is being performed and the communication IF 15 (see FIG. 2) thus finishes receiving the user program at a time point P1 will be described. Moreover, hereinbelow, the case where the editing content of online editing is to change the function block FB1 used in the program Pa1 of the task A and the program Pb2 of the task B to the function block FB1a will be described as an example.

Moreover, the operation described below is performed by the CPU 11 of the CPU unit 1 executing the system program 121. That is to say, the system program 121 is a system program for causing the CPU unit 1 to execute the operation described below.

First, the execution cycles of the tasks A, B, and C are started simultaneously with the control cycle. It should be noted that processing of the tasks A, B, and C at this time is the same as that for the regular operation. Then, the communication IF 15 finishes receiving the function block FB1a at the time point P1.

After that, during the period of time from when execution of the tasks A, B, and C has been finished until when the tasks A, B, and C are executed again, the editing content of online editing is reflected. Specifically, when the execution cycles of the tasks A, B, and C are simultaneously started (during the period of time from when execution of the tasks A, B, and C has been finished until when the execution cycles of the tasks A, B, and C are simultaneously started again), the editing content of online editing is reflected. That is to say, when the execution cycles of the tasks A, B, and C coincide at a time point P2, the function block FB1 stored in the ROM 12 (see FIG. 2) is updated to the function block FB1a.

Thus, even after the function block FB1a has been received, the function block FB1 is used in the program Pa1 of the task A and the program Pb2 of the task B until the execution cycles of the tasks A, B, and C are simultaneously started. Then, after the simultaneous start of the execution cycles of the tasks A, B, and C, the editing content is reflected, and therefore, the function block FB1a is used in the program Pa1 of the task A and the program Pb2 of the task B.

In other words, the function block FB1 is used in the program Pa1 and the program Pb2 until the time point P2 at which the execution cycles of the tasks A, B, and C coincide, and the function block FB1a is used in the program Pa1 and the program Pb2 after the time point P2 at which the execution cycles of the tasks A, B, and C coincide.

According to the first embodiment, as described above, in the case where the execution cycles of all the tasks (tasks A, B, and C) of the plurality of tasks (tasks A, B, and C) to be executed coincide after the user program (function block FB1a) has been received, the user program (function block FB1) stored in the ROM 12 is changed to the received user program (function block FB1a).

With such a configuration, even in the case where the tasks have different periods, a change to the user program is simultaneously reflected in the tasks. Thus, it is possible to use the function block FB1 in the program Pa1 and the program Pb2 until the time point P2 at which the execution cycles of the tasks A, B, and C coincide and to use the function block FB1a in the program Pa1 and the program Pb2 after the time point P2 at which the execution cycles of the tasks A, B, and C coincide. Accordingly, in the case where the function block FB1 used in the tasks A and B is changed to the received function block FB1a, a situation in which while the change is reflected in the task A having a short period, the function block FB1 before changing is retained and the change is not reflected in the task B having a long period does not arise.

That is to say, a situation in which the function block FB1a is used in the user program Pa1 of the task A and the function block FB1 is used in the user program Pb2 of the task B does not arise. As a result, the consistency among the calculation results of the tasks can be maintained, and therefore, the user program can be updated while processing is being performed in a multitasking manner. In other words, online editing can be performed appropriately while processing is being performed in a multitasking manner.

Moreover, according to the first embodiment, the POU stored in the ROM 12 is updated when the execution cycles of all the tasks (tasks A, B, and C) coincide, and thus a change to the POU can be simultaneously reflected in the tasks in an easy manner.

Moreover, according to the first embodiment, the CPU 11 is single-core and executes a plurality of tasks concurrently by time sharing, and therefore, the processing capacity of the CPU 11 can be used efficiently.

Moreover, according to the first embodiment, the periods of the tasks B and C are integral multiples of the period of the task A, and this allows the execution cycles of the tasks A, B, and C to readily coincide.

Second Embodiment

The configuration of the CPU unit 1 according to a second embodiment will be first described.

The CPU unit 1 (see FIG. 2) according to the second embodiment is configured so that after the POU (function block FB1a) of the user program uploaded by the tool apparatus 70 has been received by the communication IF 15, when the execution cycles of tasks (tasks A and B) containing the POU (function block FB1) to be edited by online editing, of a plurality of tasks (tasks A, B, and C) to be executed, coincide, the POU (function block FB1) of the user program stored in the ROM 12 is changed to the received POU (function block FB1a). It should be noted that, in the CPU unit 1, a task containing the POU to be edited by online editing can be determined by the CPU 11 based on the information L1 regarding the tasks stored in the ROM 12.

It should be noted that the configuration of the CPU unit 1 according to the second embodiment is otherwise the same as that of the CPU unit 1 according to the first embodiment. Moreover, the regular operation of the CPU unit 1 according to the second embodiment is the same as that of the CPU unit 1 according to the first embodiment.

Figure 6:
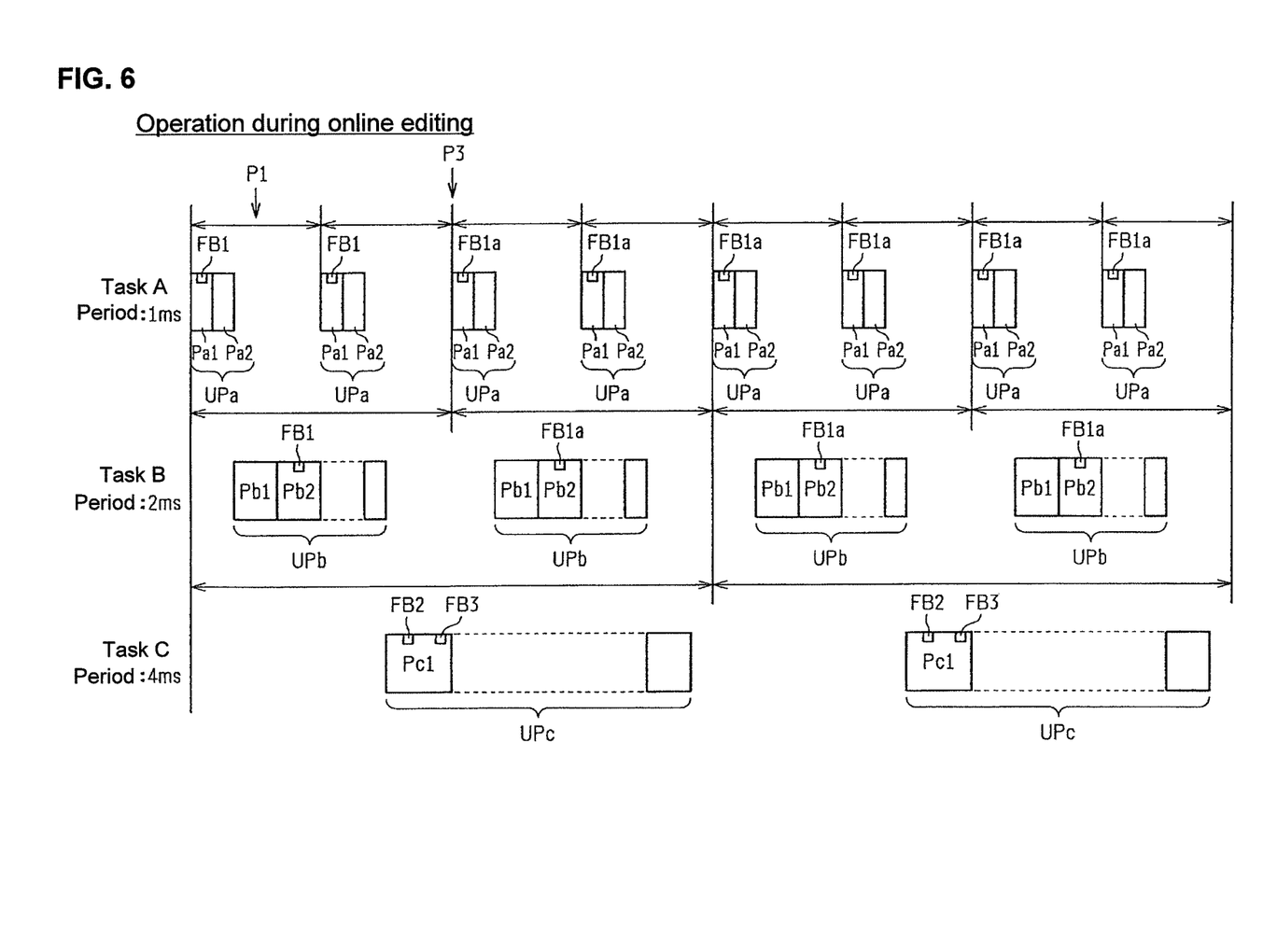
FIG. 6 is a time chart for explaining the operation of a CPU unit according to a second embodiment of the present disclosure during online editing.

Next, the operation of the CPU unit 1 according to the second embodiment during online editing will be described with reference to FIG. 6. It should be noted that hereinbelow, the operation in the case where the user program is uploaded from the tool apparatus 70 while the regular operation is being performed, and thus the communication IF 15 finishes receiving the user program at the time point P1 will be described. Moreover, hereinbelow, the case where the editing content of online editing is to change the function block FB1 used in the program Pa1 of the task A and the program Pb2 of the task B to the function block FB1a will be described as an example.

Moreover, the operation described below is performed by the CPU 11 of the CPU unit 1 executing the system program 121. That is to say, the system program 121 is a system program for causing the CPU unit 1 to execute the operation described below.

First, the execution cycles of the tasks A, B, and C are started simultaneously with the control cycle. It should be noted that processing of the tasks A, B, and C at this time is the same as that for the regular operation. Then, the communication IF 15 finishes receiving the function block FB1a at the time point P1.

Moreover, whether or not the tasks A, B, and C contain the function block FB1 is determined based on the information L1 regarding the tasks stored in the ROM 12. As a result, it is determined that the tasks A and B contain the function block FB1 and the task C does not contain the function block FB1.

After that, during the period of time from when execution of the tasks A and B has been finished until when the tasks A and B are executed again, the editing content of online editing is reflected. Specifically, when the execution cycles of the tasks A and B are simultaneously started (during the period of time from when execution of the tasks A and B has been finished until when the execution cycles of the tasks A and B are simultaneously started again), the editing content of online editing is reflected. That is to say, when the execution cycles of the tasks A and B coincide at a time point P3, the function block FB1 stored in the ROM 12 is updated to the function block FB1a.

Thus, even after the function block FB1a has been received, the function block FB1 is used in the program Pa1 of the task A and the program Pb2 of the task B until the execution cycles of the tasks A and B are simultaneously started. Then, after the execution cycles of the tasks A and B have been simultaneously started, the editing content is reflected, and thus, the function block FB1a is used in the program Pa1 of the task A and the program Pb2 of the task B.

In other words, the function block FB1 is used in the program Pa1 and the program Pb2 until the time point P3 at which the execution cycles of the tasks A and B coincide, and the function block FB1a is used in the program Pa1 and the program Pb2 after the time point P3 at which the execution cycles of the tasks A and B coincide.

According to the second embodiment, as described above, after the user program (function block FB1a) has been received, the user program (function block FB1) stored in the ROM 12 is changed to the received user program (function block FB1a) when the execution cycles of the tasks (tasks A and B) containing the user program (function block FB1) to be edited, of the plurality of tasks (tasks A, B, and C) to be executed, coincide, so that in the case where the task (task C) that does not contain the user program (function block FB1) to be edited has a long period, it is unnecessary to wait until the task (task C) is finished, and accordingly, the user program can be updated quickly.

Moreover, according to the second embodiment, the ROM 12 stores the information L1 regarding the tasks, and therefore, the CPU 11 can easily determine whether or not each task contains the POU to be edited.

It should be noted that the other effects of the second embodiment are the same as those of the above-described first embodiment.

Third Embodiment

The configuration of a CPU unit 1a according to a third embodiment will be first described with reference to FIGS. 7 and 8. It should be noted that the same portions as those of the CPU unit 1 according to the first embodiment are denoted by the same reference numerals to avoid redundant descriptions hereinbelow.

Figure 7:
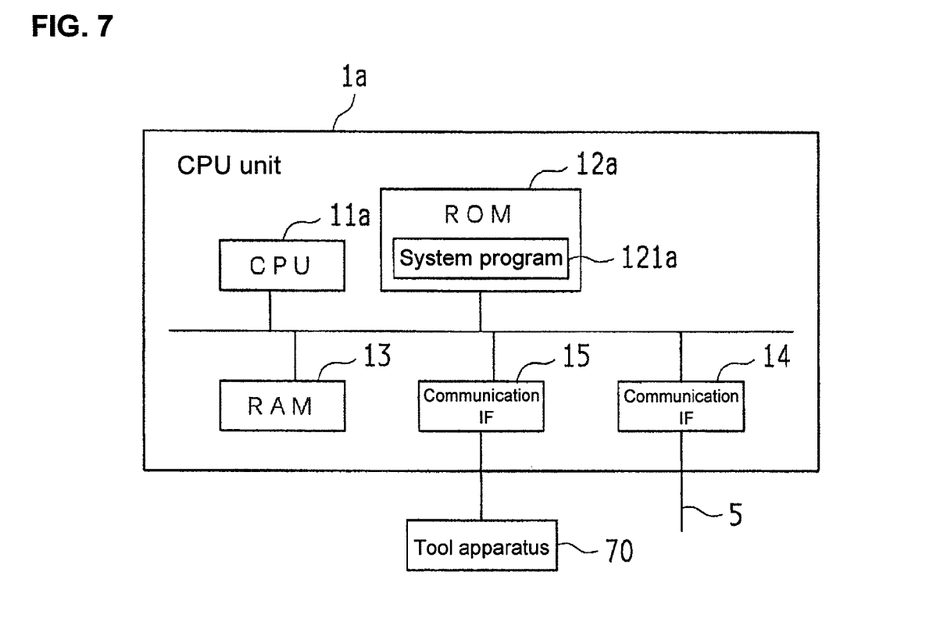
FIG. 7 is a block diagram showing the configuration of a CPU unit according to a third embodiment of the present disclosure.

As shown in FIG. 7, a system program 121a is installed in the CPU unit 1a, and the operation of the CPU unit 1a is controlled by the system program 121a being executed. It should be noted that the CPU unit 1a is an example of the "control apparatus" of the present disclosure.

The CPU unit 1a includes a CPU 11a, a ROM 12a, a RAM 13, and communication IFs 14 and 15. It should be noted that the CPU 11a is an example of the "task execution portion" (executor), "updating portion" (updater), and "determination portion" (determiner) of the present disclosure. The ROM 12a is an example of the "first storage portion" (first storage) and "second storage portion" (second storage) of the present disclosure.

The CPU 11a has a function of executing the system program 121a. The CPU 11a is dual-core and is configured to execute a plurality of tasks concurrently at the same time. That is to say, in the CPU 11a, processing is executed in a multitasking manner. It should be noted that the configuration of the CPU 11a is otherwise the same as that of the above-described CPU 11.

The installed system program 121a is stored in the ROM 12a. Moreover, information L2 (see FIG. 8) regarding tasks to be executed in the CPU unit 1a is stored in the ROM 12a. The information L2 regarding the tasks contains the name of each task, the priority of each task, the execution period of each task, the configuration of a user program executed in each task, and a POU constituting the user program of each task. It should be noted that the configuration of the ROM 12a is otherwise the same as that of the above-described ROM 12.

Figure 8:
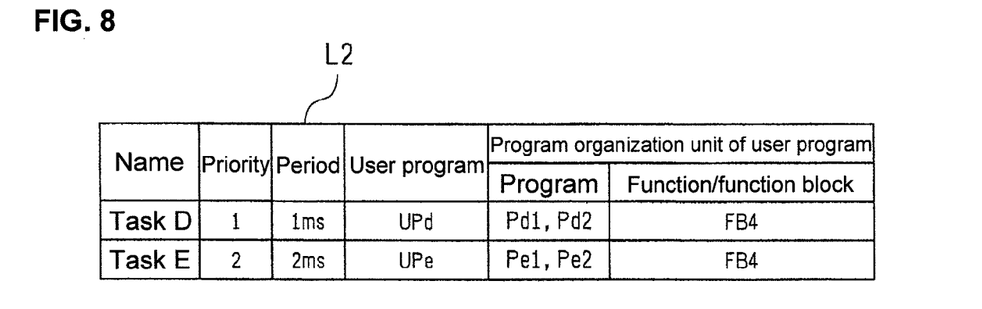
FIG. 8 is a diagram for explaining information regarding tasks to be stored in a ROM of the CPU unit shown in FIG. 7.

In the example shown in FIG. 8, a task D is executed with priority over a task E and is executed with a period of 1 ms. That is to say, the execution cycle of the task D is equal to a single control cycle (a time interval of 1 ms). Moreover, the task D contains a user program UPd constituted by programs Pd1 and Pd2. The task D also contains a function block FB4 used in the program Pd1. It should be noted that the task D is an example of the "reference task" of the present disclosure.

The task E is executed with lower priority than the task D and is executed with a period of 2 ms. That is to say, the execution cycle of the task E is twice the control cycle (a time interval of 2 ms). The period of the task E is set to an integral multiple of (twice) the period of the task D. The task E contains a user program UPe constituted by programs Pe1 and Pe2. The task E also contains a function block FB4 used in the program Pe2. It should be noted that the task E is an example of the "task other than the reference task" of the present disclosure.

The CPU unit 1a according to the third embodiment is configured so that after the POU (function block FB1a) of the user program has been received by the communication IF 15, the POU (function block FB1) of the user program stored in the ROM 12a is changed to the received POU (function block FB1a) when the execution cycles of all the tasks (tasks D and E) of the plurality of tasks (tasks D and E) to be executed coincide.

Figure 9:
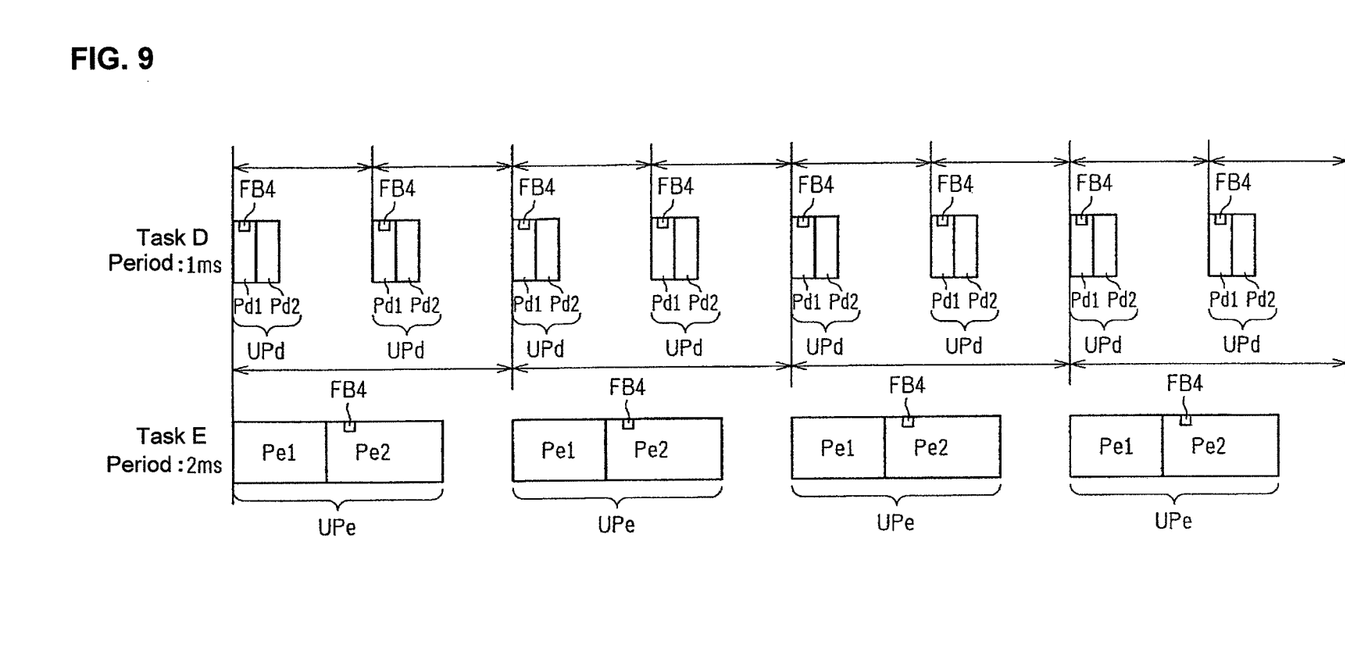
FIG. 9 is a time chart for explaining the regular operation of the CPU unit according to the third embodiment of the present disclosure.

Next, the regular operation of the CPU unit 1a according to the third embodiment will be described with reference to FIG. 9. It should be noted that the operation described below is performed by the CPU 11a of the CPU unit 1a (see FIG. 7) executing the system program 121a. That is to say, the system program 121a is a system program for causing the CPU unit 1a to execute the operation described below.

In the CPU unit 1a, a predetermined initialization process is executed once the power is turned on.

Then, the execution cycles of the tasks D and E are started simultaneously with the control cycle. It should be noted that the task D is executed with a period of 1 ms, and the task E is executed with a period of 2 ms.

In the CPU unit 1a according to the third embodiment, the tasks D and E are processed concurrently. Then, after processing of the task D has been finished, when 1 ms has elapsed after the simultaneous start of the execution cycles of the tasks D and E, the execution cycle of the task D has elapsed, and thus execution of the task D is started. Then, after the processing of the task D has been finished and the processing of the task E has been finished, when 2 ms has elapsed after the simultaneous start of the execution cycles of the tasks D and E, the execution cycles of the tasks D and E have elapsed, and thus, the tasks D and E are executed again. The above-described operation is performed repeatedly thereafter.

It should be noted that the operation of the CPU unit 1a according to the third embodiment during online editing is substantially the same as that of the CPU unit 1 according to the first embodiment.

According to the third embodiment, as described above, since the CPU 11a is dual-core and executes a plurality of tasks concurrently at the same time, the task processing capacity can be improved.

It should be noted that the other effects of the third embodiment are the same as those of the above-described first embodiment.

It should be noted that the embodiments disclosed herein are intended to be illustrative in all respects and should not be construed as the basis for restrictive interpretations. Therefore, the technical scope of the present disclosure is not intended to be interpreted based on only the above-described embodiments, but rather is defined based on the description in the claims. Moreover, all changes within meanings and scopes equivalent to the claims are embraced by the technical scope of the present disclosure.

For example, although an example in which the PAC 100 includes the CPU unit 1, the input unit 2, the output unit 3, and the power supply unit 4 was described in the first embodiment, the present disclosure is not limited to this example, and the PAC may include other units such as a communication unit, or the PAC may not include the input unit.

Moreover, although an example in which the PAC 100 is constituted by a plurality of units was described in the first embodiment, the present disclosure is not limited the this example, and the PAC may be constituted by a single casing and functions of the individual units incorporated in that casing.

Moreover, in the first to third embodiments, the tasks may include a task (event task) that is executed when a preset condition for execution is fulfilled in addition to a task (fixed cycle task) that is executed periodically.

Moreover, although examples in which the editing target is a function block were described in the first to third embodiments, the present disclosure is not limited to these examples, and the editing target may be a function.

Moreover, although examples in which a single POU (function block) is to be edited were described in the first to third embodiments, the present disclosure is not limited to these examples, and there may be a plurality of POUs to be edited.

Moreover, although examples in which the ROM 12 stores the user program as well as the information L1 regarding tasks were described in the first and second embodiments, the present disclosure is not limited to these examples, and a ROM storing information regarding tasks and a ROM storing a user program may be provided separately. It should be noted that the same applies to the third embodiment.

Moreover, in the third embodiment, in the case where the number of tasks is three or more, the CPU may update a POU stored in the ROM when the execution cycles of tasks containing the POU to be edited, of the plurality of tasks to be executed, coincide.

Moreover, although an example in which the CPU 11a is dual-core was described in the third embodiment, the present disclosure is not limited to this example, and, for example, the CPU may be quad-core. That is to say, the number of cores of the CPU may be any number.

INDEX TO THE REFERENCE NUMERALS 1, 1a . . . CPU unit (control apparatus), 11, 11a . . . CPU (task execution portion, updating portion, determination portion), 12, 12a . . . ROM (first storage portion, second storage portion), 15 . . . communication IF (accepting portion), 60 . . . controlled device, 121, 121a . . . system program

What is claimed is:

1. A control apparatus for controlling a device, the apparatus comprising:
    a first storage that stores a user program containing a program organizer;
    a task executor that executes a task containing the user program;
    an updater that updates the program organizer stored in the first storage; and
    an acceptor that accepts an update of the program organizer by the updater,
    wherein the task executor is configured to execute a plurality of tasks simultaneously and periodically in a multitasking manner, and to execute each of the plurality of tasks with an execution cycle corresponding to the task, the plurality of tasks including the task containing the user program, and
    the updater is configured to update the program organizer stored in the first storage during a period of time from when the task executor has finished execution of at least two of the plurality of tasks in the respective execution cycles until when the execution cycles of the at least two of the plurality of tasks are started simultaneously again,
    wherein the updater is configured to update the program organizer stored in the first storage during a period of time from when execution of the tasks to be executed by the task executor that contain the program organizer for which the update was accepted by the acceptor has been finished in the respective execution cycles until when the execution cycles of the tasks containing the program organizer for which the update was accepted by the acceptor are started simultaneously again.

2. The control apparatus according to claim 1, further comprising:
    a second storage that stores information regarding a task to be executed by the task executor; and
    a determiner that determines whether the program organizer for which the update was accepted by the acceptor is contained in the task to be executed by the task executor based on the information regarding the task stored in the second storage.

3. The control apparatus according to claim 1, wherein the task executor is configured to execute a plurality of tasks simultaneously.

4. The control apparatus according to claim 1, wherein the task executor is configured to execute a plurality of tasks simultaneously by time sharing.

5. The control apparatus according to claim 1,
    wherein the plurality of tasks include a reference task and a task other than the reference task, and
    the execution cycle of the task other than the reference task is set to an integral multiple of the execution cycle of the reference task.

6. A non-transitory computer readable medium storing a system program that can be executed on a control apparatus for controlling a device, the program causing the control apparatus, comprising a storage portion storing a user program containing a program organizer, to perform:
    simultaneously and periodically executing a plurality of tasks in a multitasking manner, and executing each of the plurality of tasks with an execution cycle corresponding to the task, the plurality of tasks including a task containing the user program; and
    updating the program organizer stored in the storage during a period of time from when the execution of at least two of the plurality of tasks has been finished in the respective execution cycles until when the execution cycles of the at least two of the plurality of tasks are started simultaneously again;
    accepting an update of the program organizer,
    wherein the updating updates the program organizer stored in the first storage during a period of time from when execution of the tasks to be executed by the task executor that contain the program organizer for which the update was accepted has been finished in the respective execution cycles until when the execution cycles of the tasks containing the program organizer for which the update was accepted are started simultaneously again.

* * * * *